United States Patent [19]

Tsakiris

[11] Patent Number: 5,736,968
[45] Date of Patent: Apr. 7, 1998

[54] COMPUTER CONTROLLED PRESENTATION SYSTEM

[75] Inventor: Alexander L. Tsakiris, Dallas, Tex.

[73] Assignee: Mind Path Technologies, Inc., Dallas, Tex.

[21] Appl. No.: 385,997

[22] Filed: Feb. 3, 1995

[51] Int. Cl.[6] .................................................. G09G 5/00
[52] U.S. Cl. ........................... 345/2; 345/1; 345/326; 345/330; 345/508
[58] Field of Search ............................. 345/1, 2, 3, 156, 345/326, 330, 508, 329; 359/142, 148; 395/153, 155

[56] References Cited

U.S. PATENT DOCUMENTS

| | | |
|---|---|---|
| 4,626,848 | 12/1986 | Ehlers . |
| 4,684,935 | 8/1987 | Fujisaku et al. ........................... 345/1 |
| 4,718,112 | 1/1988 | Shinoda . |
| 4,885,632 | 12/1989 | Mabey et al. . |
| 5,204,768 | 4/1993 | Tsakiris et al. ........................ 359/148 |
| 5,373,307 | 12/1994 | Shiraishi ............................... 345/2 |

Primary Examiner—Richard Hjerpe
Assistant Examiner—Kent Chang
Attorney, Agent, or Firm—Gregory W. Carr; Robert D. McCutcheon; Winstead Sechrest & Minick P.C.

[57] ABSTRACT

A computer based presentation system allows a presenter to view on a monitor associated with a computer an image prior to its display on a television monitor or projection system to an audience. The system includes a video frame buffer having an input coupled to a video port of the computer for receiving a video signal generated by the computer. The buffer captures and stores in memory a frame carried by the video signal. An output of the video buffer is connected to a video display adapter for continuously converting the stored image frame to a second video signal for transmission to a television monitor for display to an audience. A command to update the video frame buffer is generated by a hand-held remote and transmitted to a serial port of the computer through a photoelectric sensor housed with the video buffer and video display adapter. The computer signals the video buffer through the serial port to update the contents of its memory with the next image frame carried by the video signal.

9 Claims, 2 Drawing Sheets

COMPUTER CONTROLLED PRESENTATION SYSTEM

FIELD OF INVENTION

The invention pertains generally to apparatus and processes for controlling presentation of visual graphics stored on a specially programmed computer.

BACKGROUND OF THE INVENTION

Personal computers running presentation graphics programs or applications such as Lotus Freelance® or Microsoft Powerpoint® have been used for several years to generate high quality graphic images for presentations to audiences. Current versions of the programs also enable a presenter, instead of printing images on transparencies, to play them back from the computer's memory or storage devices in a predetermined order during a presentation. In addition to the convenience of not having to fumble with transparencies, a computer-based presentation has several advantages over traditional transparencies. One primary advantage is that a computer-based presentation can be quickly and easily edited with the computer, sometimes only minutes before the presentation. Old images can be removed, additional images inserted, new images generated or old images updated with new data very easily.

Due to their compactness, laptop and notebook computers currently are frequently used for making computer-based presentations. A presenter often need only bring to the meeting his or her laptop, on which is stored the presentation graphics program, the images and the supporting data used to create the images. Most commercially available laptop computers usually have a built-in monitor and an auxiliary video output that provides the same video signal as supplied to the built-in monitor. A display device for the audience, for example, a large television monitor or projector, is connected through a video cable to the auxiliary video output. A wireless remote control provides additional flexibility and control to a presenter during a presentation by enabling a presenter to perform certain preselected functions without standing at the computer keyboard. The remote control sends presentation commands to the computer which are acted on by a presentation control program running in the background concurrently with the presentation graphics program. One example of this type of presentation control program is Mind Path Presentation F/X of Mind Path Technologies, Inc. of Dallas, Tex. When the computer receives the commands, the presentation control program intercepts the command and executes and/or causes to be executed programmed routines for carrying out the command. For example, a simple presentation command could be "next image" or "previous image" that is transmitted by pressing, respectively, a "forward" button or "reverse" button on the remote control.

SUMMARY OF THE INVENTION

One of the limitations of computer-based presentations using current types of personal computers, such as a laptop or notebook, is that the computer does not permit the presenter to see the next image in the presentation before the audience sees it. The audience display system receives the same video signal the computer generates for its own monitor and thus simply repeats what the presenter sees on his or her computer. A presenter may forget what is coming next, or worse yet, know what is coming next but not want to show it. Unlike traditional transparencies, the computer image cannot be picked up and looked at before it is placed on an overhead projector.

The invention overcomes this limitation and allows a presenter to preview an image during a presentation before it is displayed to an audience. According to various aspects of the invention, a video frame buffer and display adapter are interconnected between a video output of a computer, which is running a presentation application to generate the images, and an audience video display system. The video buffer captures a frame on a video signal generated by the computer for its own monitor, and stores the frame in memory. The video display adapter reads the stored image frame from memory and converts it to a second video signal in a format for communication to, and display on, the audience's video display system. A logic signal generated by the computer and communicated to the video frame buffer indicates to the buffer to capture and store the next complete frame on the video signal output from the personal computer. While an audience continues to be shown the video image stored in the buffer, a presenter is able to run a presentation and presentation control programs on the computer and view their output on the computer's monitor. Once the next image is ready for display to the audience, the presenter enters a command that causes the computer to transmit the buffer signal to the video frame buffer to capture and store the next complete frame on the computer's video signal.

According to other aspects of the invention, an infrared light sensor is housed light either as a discrete component for connection between the computer and audience display system or as part of the audience's video display system. The infrared sensor receives presentation commands transmitted from a hand-held remote and communicates the commands via cable to a serial port of the computer. The cable also communicates from the serial port to the video buffer the buffer control signal. When the computer receives a command to update with a current image, a presentation control program running in the background executes a series of steps that removes presentation notes or other information which may be overlaid onto the image being generated by the computer, signals the video buffer to update the buffer with a frame of the current video image, and then restores the notes for use by the presenter.

A more complete understanding of the present invention and the advantages thereof may be had by reference to the following detailed description of a preferred embodiment when taken in conjunction with the accompanying drawings, wherein:

DETAILED DESCRIPTION OF THE PREFERRED EMBODIMENTS

Figure 1:
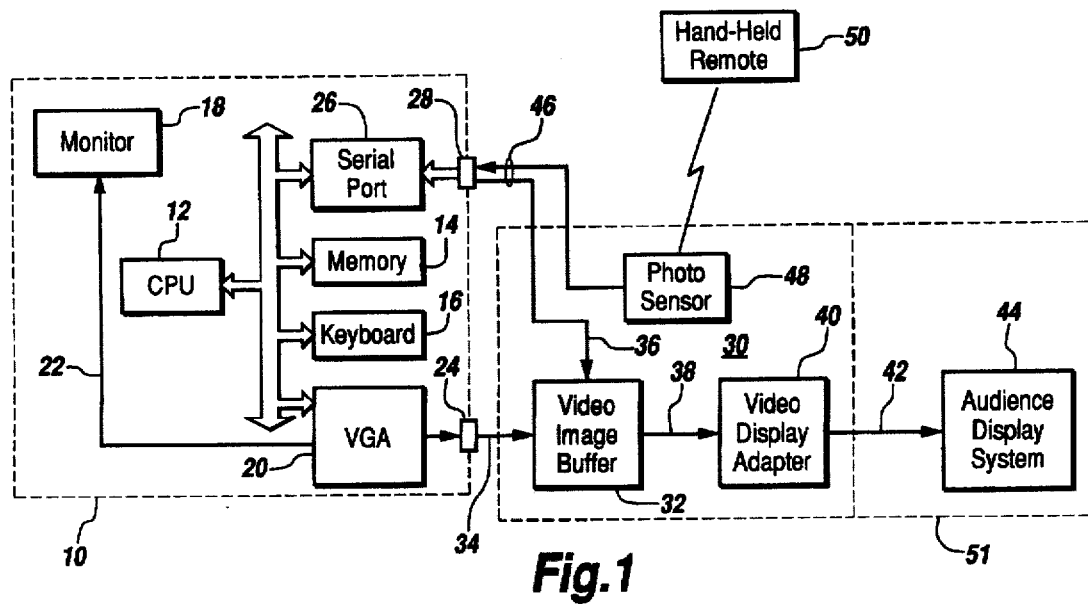
FIG. 1 is a block schematic diagram of a computer-based presentation system in accordance with the invention.

Referring to FIG. 1, a computer 10 includes a central processing unit (CPU) 12 for executing program instructions stored in memory or data storage 14. Data may be manually entered into the computer using keyboard 16. The CPU generates data for creating a graphical image for display on video monitor 18 associated with the computer. A video display adapter 20 converts data the from the CPU into a video signal and sends this video signal on line 22 to the monitor for displaying the image on the video monitor. In a preferred embodiment, computer 10 is a microcomputer or personal computer having a video display adapter conforming to a widely used standard known as "VGA," which is an acronym for video graphics adapter. The CPU generates a bit-mapped image that is stored in video memory in the VGA adapter 20. The VGA adapter rasterizes the bit-mapped image to generate the analog video signal on line 22 that is encoded with the image according to the VGA format for display by video monitor 18. As is conventional in laptop personal computers, the VGA video signal is also provided to an external video outlet 24. The computer also includes a serial input/output (I/O) data port 26 having a receptacle 28 for connection with an external device to enable two-way asynchronous data communication with the external device. Computer 10 is intended as a generic example of the primary functional components of current personal computers. Other types of computers may be used in accordance with the principles of the invention.

Figure 2:
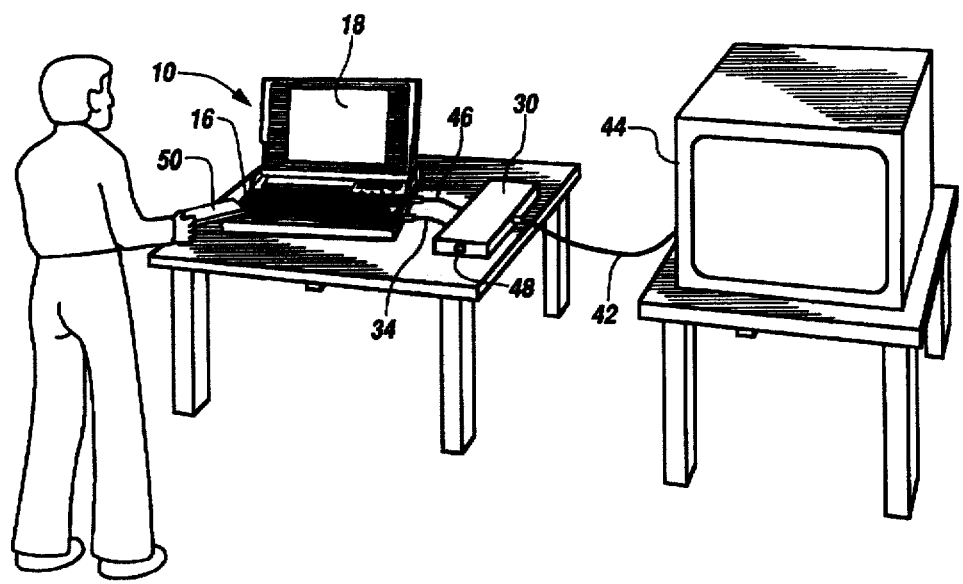
FIG. 2 is figurative representation of the computer-based presentation system of FIG. 1.

Referring now to FIGS. 1 and 2, interconnected between computer 10 and audience display system 44 is a specially adapted video frame buffer and converter unit 30. The video buffer and converter unit includes a video image buffer 32 having an input coupled through video cable 34 to video outlet 24. The video image buffer receives the video signal generated by the VGA adapter 20 and converts it on a frame-by-frame basis to a digital image to be stored in memory, for example a dual port, video random access memory (VRAM). The video image buffer, in response to a predetermined logical buffer control signal on line 36, freezes or holds on the next-complete frame on the video signal. Otherwise, when the video buffer is not frozen the buffer continually overwrites the memory with successive frames received on that video signal. This is referred to as a "pass-through" mode. Inverting the buffer control signal on line 36 places the video frame buffer in pass-through mode. The digital image stored in the buffer memory is continuously read from the buffer on line 38 by video display adapter 40 for conversion of the digital image frame stored in the video buffer to a second video signal for transmission on line 42 to audience video display system 44. The audience video display system is a television monitor and the second video signal is formatted for television. However, other types of audience displays may be used, including video or television projectors, television receivers or transparent flat panel screens for overlaying onto overhead projectors. The video display adapter 40 would then be chosen to provide the second video signal in a format required by the audience display system used.

The computer 10 generates the buffer control signal for the video image buffer at its serial port 26 for transmission by data communications cable 46 to video buffer and converter unit 30. Unit 30 also includes an infrared light detector or photodetector 48. The photodetector senses flashes of infrared light signals that are encoded with data representing a presentation control command data from a wireless, hand-held remote control unit 50. The hand-held remote generates the encoded light signals in response to a presenter depressing one of several specially programmed buttons on the remote. Such a remote is described in U.S. Pat. No. 5,204,768 of Tsakiris, et al. The light detector converts the sensed light directly into electrical signals, encoded with the same data as the light signals, for transmission to the serial port via cable 46. As indicated by dashed line 51 in FIG. 1, the frame buffer and converter unit 30 may be integrated with the audience display system 44 if desired.

Figure 3:
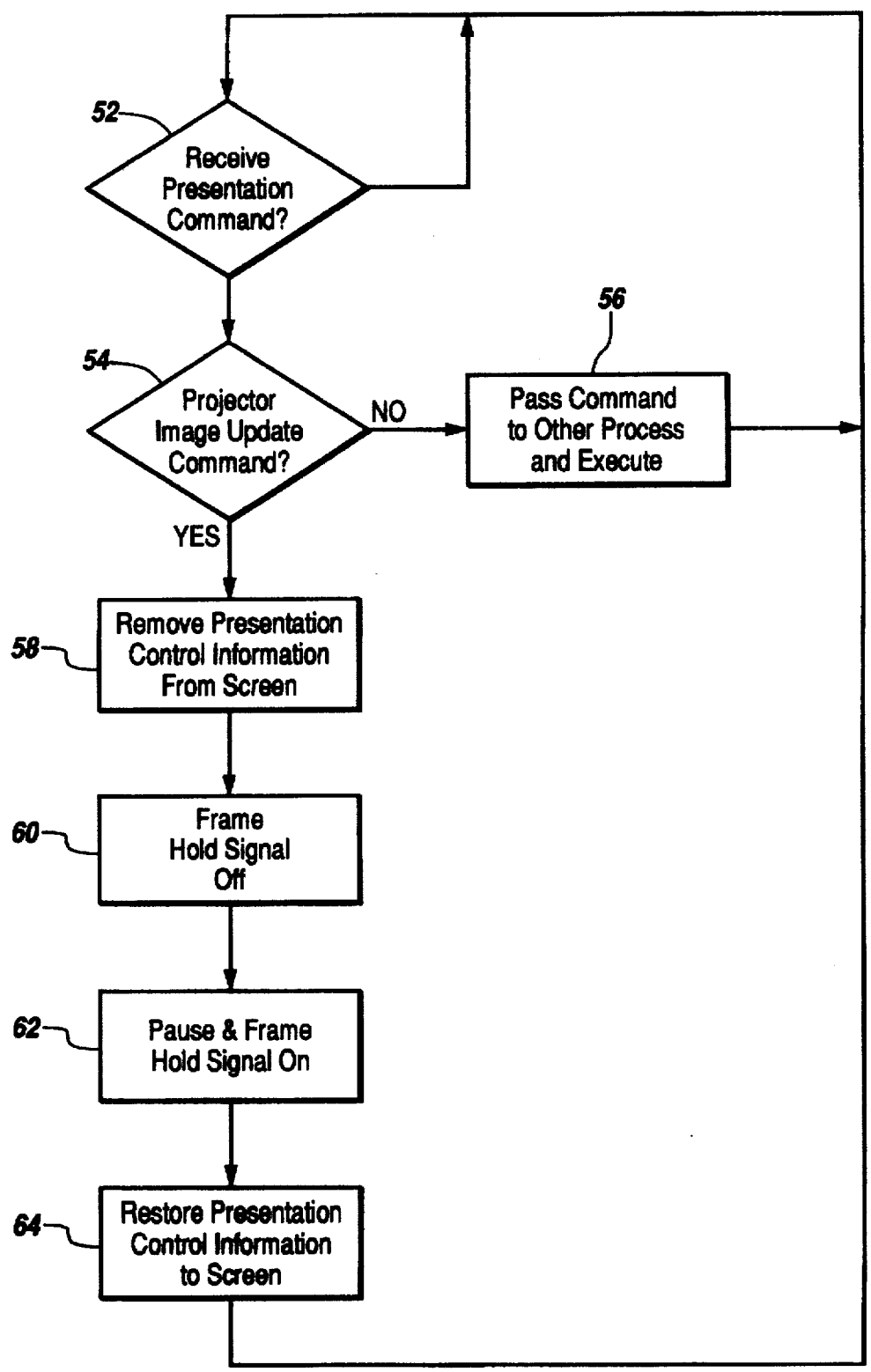
FIG. 3 is a flow diagram of a programmed process run by the computer-based presentation system of FIG. 1.

FIG. 3 is a flow chart depicting a process performed in conjunction by a presentation control program such as Mind Path Presentation F/X, and a presentation graphics application program, such as Lotus Development Corporation's FREELANCE® or Microsoft Corporation's POWERPOINT®, both of which run concurrently on computer 10. Referring now to both FIGS. 1 and 3, the computer waits for a presentation command to be received from a presenter, as indicated by decision step 52. The command may be received from keyboard 16 or through serial port 26 from a signal transmitted by remote control unit 50. At step 54, the computer determines whether it is an "update" audience display command. If it is not, the command is passed to another presentation process for execution at step 56. If it is an update command, the computer executes an update process. At step 58, the computer removes from the video image generated by VGA adapter 20 presentation control information. Presentation control information may include presentation notes and other information for use by a presenter in controlling the presentation but not intended for viewing by an audience. Once this information is cleared from the video image, the video buffer 32 is instructed in steps 60 and 62 to write in memory the next complete frame transmitted by the computer on the video signal on cable 34 and to hold it. This is accomplished by changing the state of the buffer control signal from a first state, in which the buffer is in a hold mode to a second state indicating the "pass-through" mode. After a brief pause, long enough to allow for capture of one complete frame from the first video signal on cable 34, the control signal is returned to the first state indicating the hold mode. The computer then, at step 64, restores the presentation information to the video signal generated by the computer and returns to step 52.

A preferred embodiment of the invention has been described in detail. However, the invention is not intended to be limited to the embodiment disclosed and described. Numerous rearrangements, modifications, substitutions to the disclosed embodiment are possible without departing from the scope and spirit of the invention as set forth by the claims.

What is claimed is:

1. An apparatus for controlling presentation of visual graphics to an audience comprising:

a video cable for connection to a video output port of a computer for transmitting a first video signal generated by the computer;

a data communications cable for connection to an external data communications port of the computer;

a video buffer connected to the video cable for converting and storing a frame of an image carried by the video signal on the cable, the video buffer adapted to capture and hold the image frame in response to receiving a predetermined control signal on the data communications cable from the computer;

means for converting the image frame stored by the buffer to a second video signal.

means for removing from the first video signal presentation control information in response to an update command signal receiving from a presenter;

means for generating the predetermined control signal for transmission to the video buffer to holding in the video buffer a next frame transmitted on the first video signal; and means for restoring to the first video signal the presentation control information after the video buffer captures and hold the next frame.

2. The apparatus of claim 1 further comprising means for displaying the second video signal to an audience.

3. The apparatus of claim 1 further comprising a specially programmed computer for generating the control signal in response to receipt of a presentation control command.

4. The apparatus of claim 1 further comprising means for receiving presentation commands transmitted by light signals from a wireless remote control unit and converting the light signals to electric signals for transmission to the computer over the data communications cable.

5. The apparatus of claim 4 wherein the presentation commands includes an update command and wherein the apparatus further includes:

means for receiving the electric presentation command signals.

6. A computer-based method for controlling presentation of graphical images stored on a computer to an audience comprising the steps of:

receiving with a computer an update command;

transmitting from an external video port of the computer, in response to receiving the update command, to an external video frame buffer a predetermined buffer control signal to capture and hold an image frame of a first video signal, generated by the computer and transmitted through the external video port to the external video frame buffer, the frame buffer interconnected between a video display adapter in the computer and a second, external video display adapter, the second video display adapter generating a second video signal of carrying the image held in the video frame buffer for communication to a means for displaying video images to an audience;

removing presentation control information on the first video signal generated by the computer in response to receiving the update command and prior to transmitting to the video frame buffer the buffer control signal; and restoring the presentation control information to the first video signal after the video buffer captures and holds the image frame from the first video signal.

7. The method of claim 6 wherein the computer signals the video frame buffer through the external data communications port.

8. The method of claim 6 wherein the update command is received by the computer through an external data communications port.

9. The method of claim 8 wherein the computer signals the video frame buffer through the external data communications port.

* * * * *